Feb. 19, 1963  J. J. DZIENIS ETAL  3,078,118
UNITARY VEHICLE BODY STRUCTURE
Filed Oct. 13, 1960  5 Sheets-Sheet 3
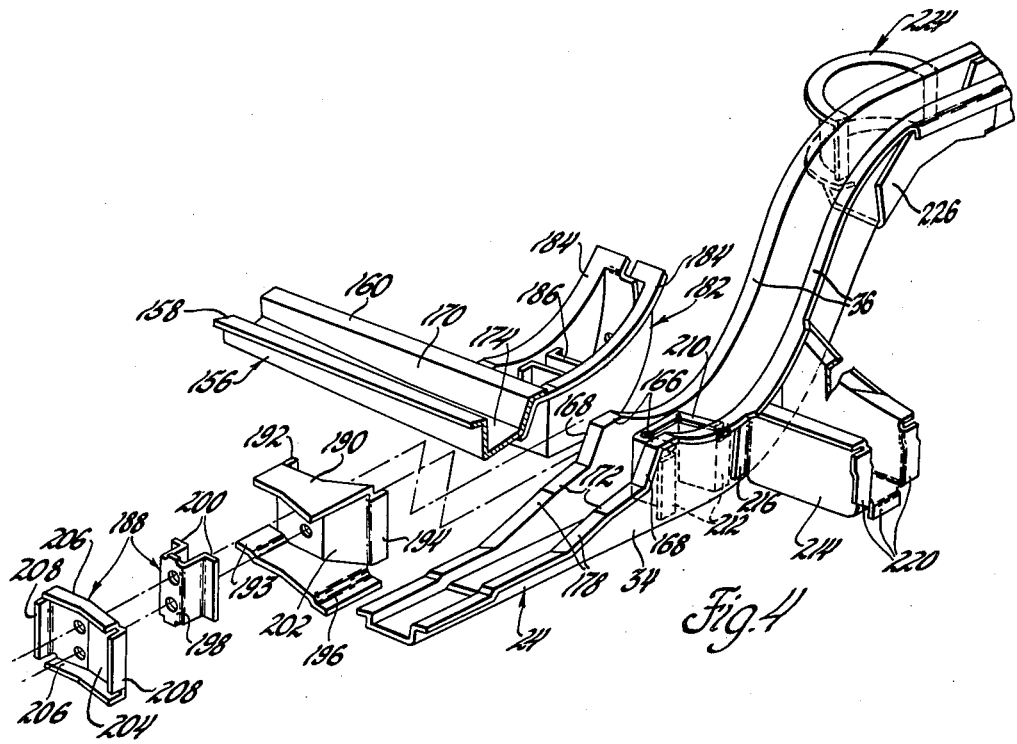
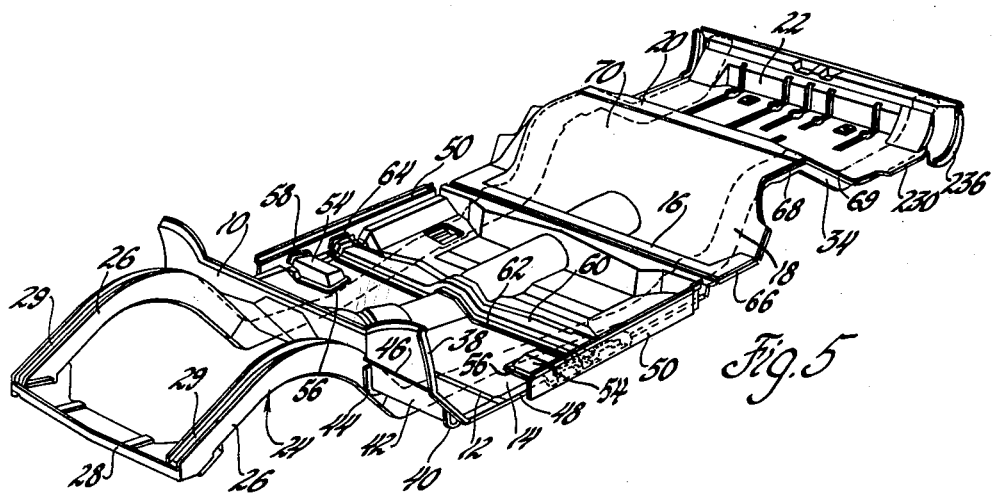
INVENTORS
Jerome J. Dzienis,
George R. Gillespie,
Frank D. Trevillian &
Louis J. Weber
BY
Herbert Furman
ATTORNEY

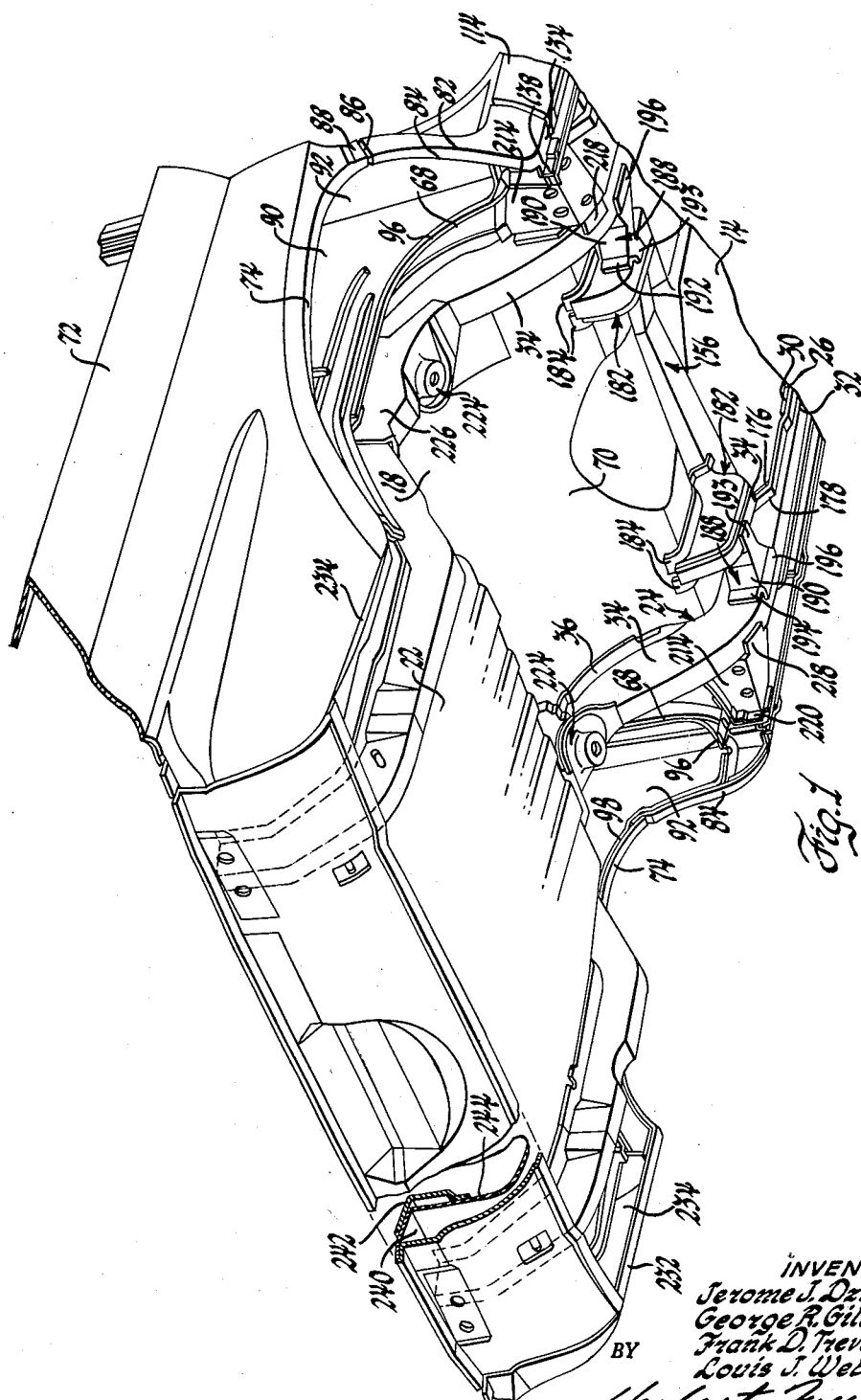

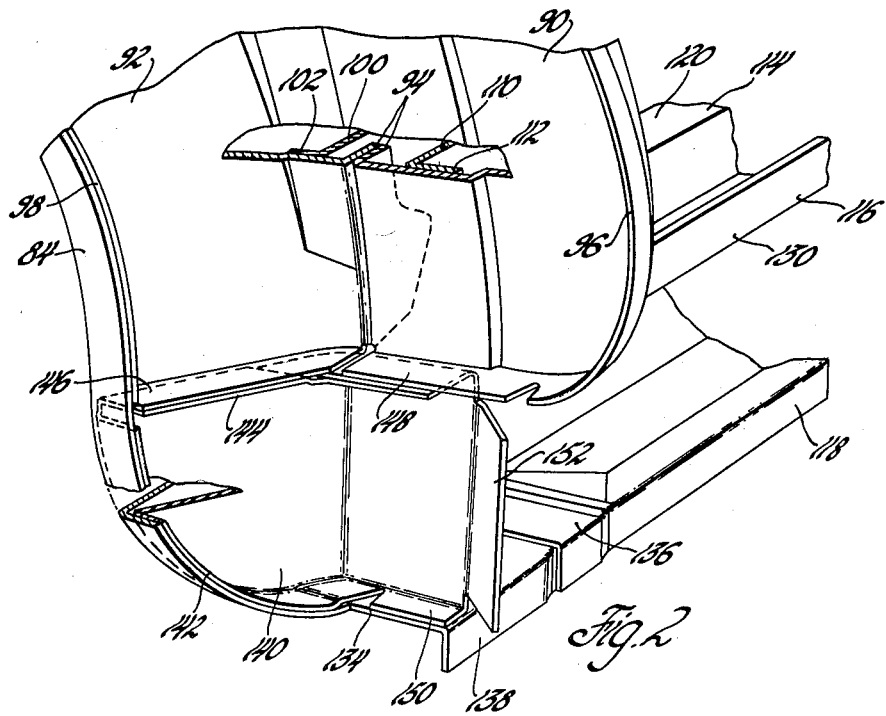
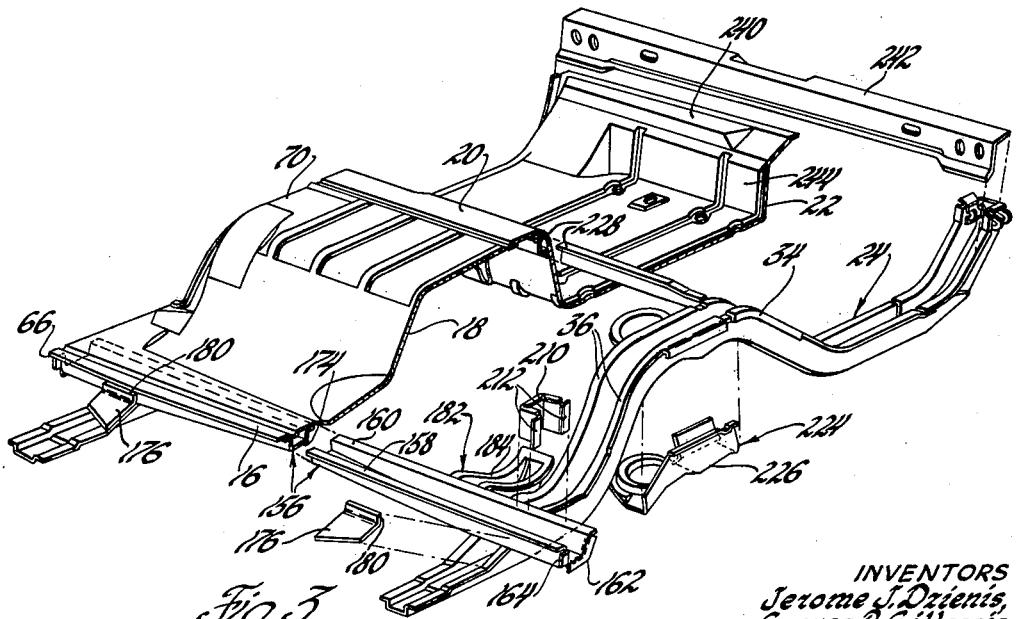

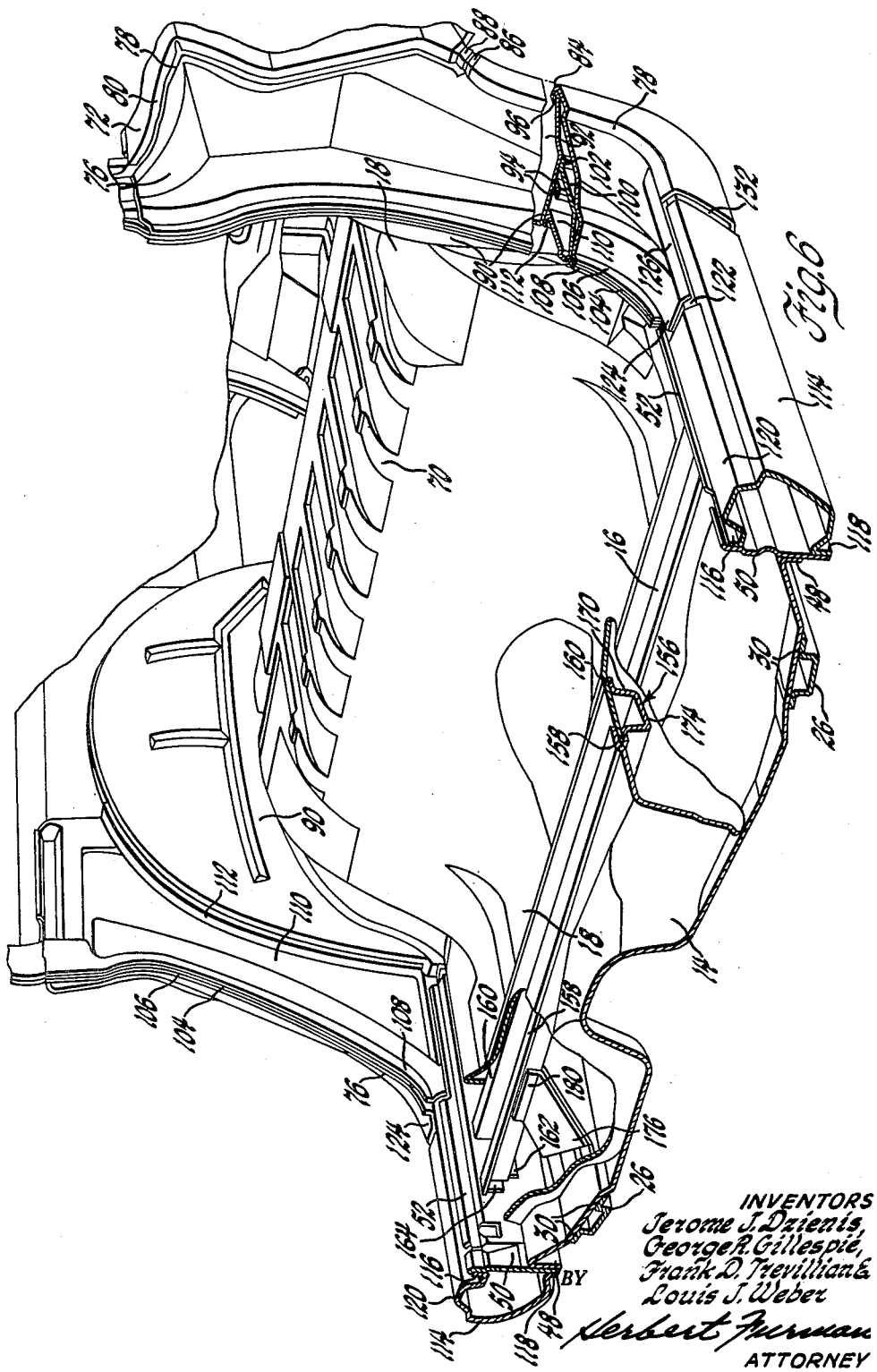

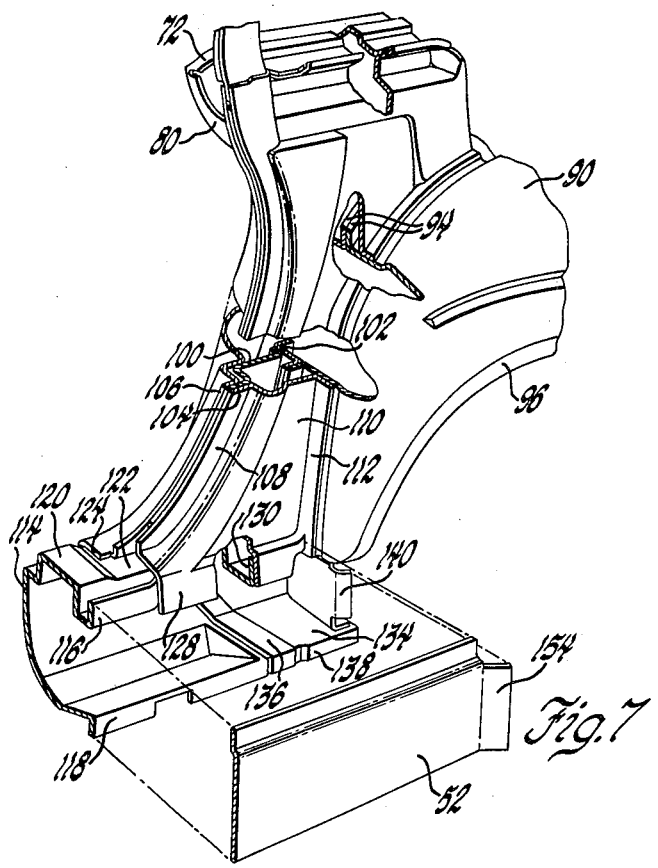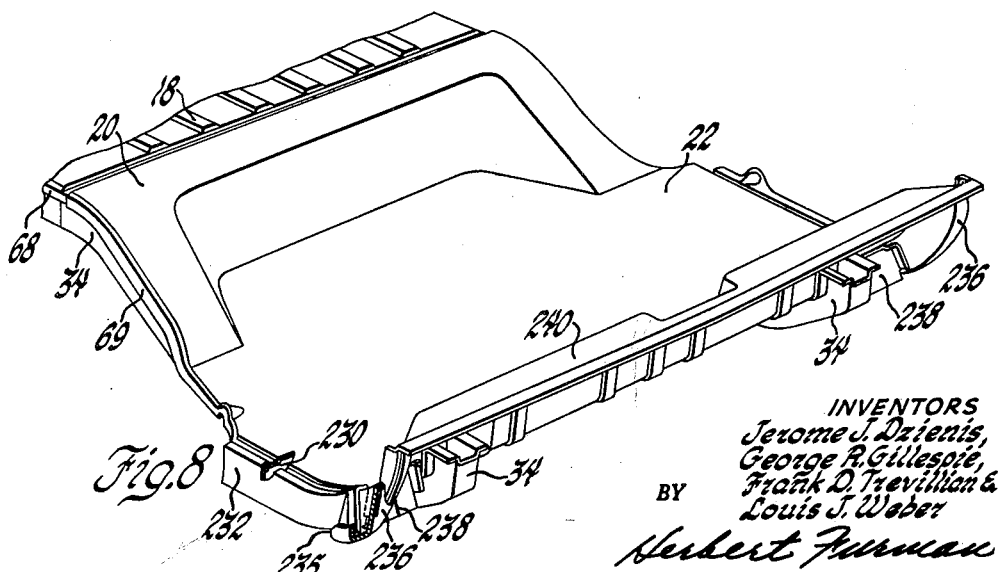

United States Patent Office 3,078,118
Patented Feb. 19, 1963

3,078,118
UNITARY VEHICLE BODY STRUCTURE
Jerome J. Dzienis, George R. Gillespie, and Frank D. Trevillian, Royal Oak, and Louis J. Weber, Detroit, Mich., assignors to General Motors Corporation, Detroit, Mich., a corporation of Delaware
Filed Oct. 13, 1960, Ser. No. 62,473
10 Claims. (Cl. 296—28)

This invention relates to vehicle bodies and more particularly to vehicle bodies of the integral or self-sustaining type.

The primary object of this invention is to provide an improved underbody structure, body lock pillar structure, and wheel house structure for integral or self-sustaining bodies. In carrying out this object of the invention, the rear body outer panels, commonly known as the quarter outer panels, define portions of the body wheel openings. The body panels are secured to body lock pillar members, with the lock pillar members including extensions which form or define the remainder of the body wheel openings and which merge into and form part of the rocker panel or sill structures so as to rigidly interconnect the outer body sheet metal with the rocker panel structures. Inner and outer wheel housings are provided and are located between the floor panel structure and the body outer panels at each side of the body being secured to both and also to the extensions of the body lock pillar members. The wheel housings are further interconnected with the lock pillar members by bracing members so as to further rigidify the lock pillar members, the wheel housings and the underbody structure. The lock pillar members, the bracing members, and inner body panel members interconnecting the wheel housings and the lock pillar members, provide a continuous pinchweld flange at the inboard edge portions of the lock pillar members, with this pinchweld flange being carried forwardly of the body by a similar pinchweld flange provided by the rocker panel structures whereby the rear door openings of the body are rigidified. The underbody structure further includes bracing means interconnecting the rocker panel structures and longitudinal rail structures secured to the floor panel structure.

This and other objects of the invention will be readily apparent from the following specification and drawings wherein:

FIGURE 1 is a partially broken away perspective view of the rear portion of a vehicle body according to this invention taken from underneath the body;

FIGURE 2 is an enlarged partially broken away view of a portion of FIGURE 1;

FIGURE 3 is a partially exploded perspective view of a portion of FIGURE 5;

FIGURE 4 is an enlarged partially exploded view of a portion of FIGURE 1 taken from above the body;

FIGURE 5 is a perspective view of the underbody structure taken from above the body;

FIGURE 6 is a partially broken away perspective view of the rear portion of the body taken from above the body;

FIGURE 7 is an enlarged partially broken away view of a portion of FIGURE 6; and FIGURE 8 is a perspective view of a portion of FIGURE 6 taken from the rear of the body.

Referring now first to FIGURE 5, wherein the entire underbody or floor structure is shown, this structure includes a toe pan or floor portion 10, the rearward edge portion 12 of which overlaps and is secured to the forward edge portion of a floor pan or floor portion 14. The rearward edge portion of the floor pan or floor portion is overlapped by and secured to the forward edge portion 16 of a rear seat pan or floor portion 18. The rearward edge of the seat pan or floor portion 18 is overlapped by and secured to the forward edge portion 20 of a rear compartment pan or floor portion 22. The frame structure, generally designated 24, includes a front U-shaped frame section which generally comprises a pair of rail structures or upwardly opening channel shaped rails 26 which extend forwardly of the toe pan 10 and are interconnected by a front cross member structure 28. The portions of rails 26 forwardly of the toe pan 10 to the cross member structure 28 are closed by closure members 29. From the toe pan 10 rearwardly of the body and underneath the floor pan 14, the rails 26 are provided with laterally extending flanges 30, FIGURE 1, which are welded or otherwise rigidly secured to the underside of the toe pan 10 and the floor pan 14. The front rails 26 terminate underneath the floor pan 14 forwardly of the seat pan 18 as can be best seen in FIGURES 5 and 6 of the drawings. The rearward ends of the rails 26 fit within and are rigidly secured to the forward ends 32 of the rear rails 34, which are of like channel shaped upwardly opening construction and are provided with laterally extending flanges 36 along their entire length which are secured to the floor pan 14, the seat pan 18 and the compartment pan 22.

The side edge portions of the toe pan 10 terminate in laterally and downwardly extending flanges 38 which are secured to like flanges 40 of outrigger braces 42 which extend between the flanges 38 and the outer sides of the rails 26, being secured to the latter by flanges 44 and also being secured to the toe pan 10 by flanges 46. Flanges 38 merge into like lateral flanges 48 provided on the side edges of the floor pan 14. Front and rear inner rocker panel members 50 and 52 have their lower edge portions secured to flanges 48 and extend upwardly therefrom. A pair of generally channel shaped front seat riser members 54 are interconnected between members 50 and the floor pan 14, members 54 being provided with flanges 56 secured to the floor pan and flanges 58 secured to members 50. A rear seat riser member 60 extends entirely across the floor pan 14, being provided with flanges 62 secured to the floor pan 14 and flanges 64 secured to the rocker panel members 50. The rear rocker panel members 52 are further secured to laterally and downwardly extending flanges 66 provided at the side edges of the seat pan 18. Flanges 66 merge into like flanges 68 and 69 which define arcuate wheel housing cutouts in the upwardly extending generally U-shaped portion 70 provided by the seat pan 18 and the compartment pan 22. Portion 70 forms a housing for the axle assembly of the vehicle.

Referring now particularly to FIGURES 1, 6 and 7 of the drawings, a rear body outer panel member 72 which is commonly known as the quarter outer panel of the body, includes a lower arcuate flanged edge portion defined by a laterally inwardly extending flange 74 which defines the major portion of the body rear outer wheel opening. As best shown in FIGURE 6, the outboard edge portion of the body lock pillar member 76 includes a flanged edge portion or laterally outwardly extending flange 78, the upper portion of which is overlapped by and secured to a forward flanged edge portion or laterally inwardly extending flange 80 of the panel 72. Pillar member 76 defines the lock pillar face, as shown in FIGURE 6, and the flanges 78 and 80 define the body outer door opening. In order to define the remainder of the body rear wheel opening, the lower portion of the flange 78 merges into an integral lock pillar extension or body outer panel continuation portion 82 terminating in an arcuate edge portion defined by a laterally inwardly extending flange 84 which forms a continuation of the flange 74 of panel 72 around the body wheel opening to define the remainder of this opening. Panel portion 82, and flange 84 terminate in portions 86 of narrower extent which are overlapped by like portions 88 of flange 80 and panel member 72 and are secured thereto.

The body wheelhouse structure includes inner and outer wheel housings 90 and 92, respectively, each being provided with a continuous laterally extending longitudinal flange 94, FIGURES 2, 6, and 7, which abut and are rigidly secured together to provide a pinchweld flange. Housing 90 includes an inner edge portion defined by a continuous flange 96 secured to the flanges 68 and 69 of the seat pan 18 and compartment pan 22. Housing 92 includes an outer edge portion defined by a laterally inwardly extending flange 98 which is secured to flange 84, as best shown in FIGURES 2 and 6, and is also secured to the flange 74, as best shown in FIGURE 1.

A generally Z-shaped brace 100, FIGURES 2, 6, 7, includes a laterally extending flange 102 which is welded to wheel housing 92 outboard of the pinchweld flanges 94. Brace 100 terminates in a laterally extending flange 104 which is secured to a like laterally extending flange 106 defining the inner edge of the lock pillar member 76. Flanges 104 and 106 are also secured to a laterally extending flange 108 of a body inner panel 110 which extends between flanges 104 and 106 and the inner wheel housing 90, as best shown in FIGURE 6, and includes a laterally extending flange 112 secured to the wheel housing 90 inboard of the flanges 94.

The outer rocker panel member 114 includes upper and lower laterally extending flanges 116 and 118, respectively, which are secured to the upper and lower edge portions of the rocker inner panel members 50 and 52 to provide a hollow body sill structure. The upper edge portion of the rocker panel members 50 and 52 and flange 116 provide a pinchweld which continues the pinchweld provided by flanges 104, 106, and 108 forwardly of the body along the lower edge of the rear door opening thereof. The rearward end of the upper generally U-shaped wall 120 of member 114 includes a portion 122 of narrower extent which is secured to a flange portion 124 of member 76 and to a flange 126 thereof which extends along the lower edge of member 76 forwardly of the portion 82 thereof.

As best shown in FIGURE 7, the lower end of member 110 terminates in an offset flange 128 which overlaps and is welded to an outwardly offset portion 130 of the flange 116 of member 114. Flange 128 fits between flange 116 and the upper edge portion of the rocker inner panel member 52, being welded to both. As best shown in FIGURE 6, the end portion of the outer wall of member 114 is offset inwardly at 132 and is overlapped by and secured to the flange 78 and portion 82 of member 76. Portion 82 further includes a laterally inwardly extending flange portion 134, FIGURES 2 and 7, which forms a continuation of flange 84, fitting within and secured to an offset flange portion 136 of the lower wall of member 114 and terminating in a laterally and downwardly extending flange 138 which forms a continuation of flange 118. In order to close the rear end of the rocker panel structure defined by members 52 and 114, a closure member 140 includes a lateral flange 142 secured to the flange 84 of portion 82 of member 78, and a lateral flange 144 secured to a flange 146 of the housing 92 and to a lateral flange 148 of housing 90. Flange 142 merges into a flange 150 which is secured to flange portion 134. Closure member 140 is further provided with an angular lateral flange 152 which is secured to a like extending flange 154 of the rocker panel member 52.

Referring now particularly to FIGURES 1, 3, 4, and 6, a brace structure or generally U-shaped bracing and reinforcing member 156 straddles the overlapping joint between the floor pan 14 and the seat pan 18 and includes lateral flanges 158 and 160 secured respectively thereto. The outer ends of member 156 include flanges 162 and 164 secured to the flanges 66 of the seat pan 18 and to the rear inner rocker panel members 52. As best shown in FIGURE 4, the rear rails 34 include flange portions 166 which seat and are secured to the flange 160 of member 156, angularly located flange portions 168 which seat and are secured to the rear side wall 170 of member 156, and angularly located flange portions 172 which seat and are secured to the base wall 174 of member 156. Angular reinforcing and closure members 176 are welded to flange portions 178 of rails 34, FIGURES 3 and 4, and include flanges 180 secured to the forward side wall of member 156.

Laterally spaced seat pan braces or brace structures 182 each generally comprise a pair of interresting inboard and outboard U-shaped members, each member being provided with an upper laterally extending flange 184 which is secured to the seat pan 18 and to the forward wall of portion 70 inboard of each of the rails 34. As clearly shown in FIGURE 4, the forward end portions of the flanges 184 are shaped so as to conform to and be secured to the flange 160 and the walls 170 and 174 of the member 156. Each brace 182 is reinforced by a generally U-shaped flanged brace member 186 which extends between the members comprising brace 182 and is secured thereto.

As shown in FIGURES 1 and 4, each brace 182 is interconnected with an adjacent rail 34 by a brace 188, the details of which are best seen in FIGURE 4. Brace 188 includes a rear generally U-shaped member 190 which opens forwardly of the body and is provided with an inboard rearward and laterally extending flange 192 secured to the outboard member of brace 182, and with an inboard lower offset flange 193 which is secured to the base or lower wall of the aforesaid outboard member of brace 182. Member 190 further includes an outboard laterally and rearwardly extending flange 194 which is secured to the inboard side wall of rail 34 and an outboard lower offset flange 196 which overlaps and is secured to the base of the rail 34. A generally U-shaped member 198 has the lateral flanges 200 thereof welded to the rear wall 202 of member 190. A front closure plate 204 includes upper and lower laterally and forwardly extending flanges 206 which are welded to the upper and lower walls of member 190, and inboard and outboard side flanges 208 which are welded to brace 182 and the inboard side wall of rail 34. Members 190, 198 and 204 are each provided with aligned apertures so as to provide mounting provisions for the forward end of a stabilizer arm for the rear suspension of the vehicle.

A generally U-shaped brace 210, FIGURES 3 and 4, fits within each rail 34 generally opposite the brace 188, with the inboard wall of brace 210 being secured to the inner surface of the inboard wall of rail 34 and with flanges 212 of the front and rear side walls of the brace 210 being secured to the inner surface of the outboard side wall of the rail 34. It can be seen that the braces 210, 188 and 182 provide a means for bracing the axle housing portion 70 of seat pan 18 to each of the rails 34 and further provide an axle suspension mounting means. This bracing means is augmented by the member 156 which extends entirely across the body between the rocker panel structures and which further braces the floor pan 14 and the seat pan 18.

A generally U-shaped bracing member 214, FIGURES 1 and 4, is located immediately rearwardly of each of the braces 210, with members 214 being provided with flanges 216 secured to the outboard side walls of rails 34, flanges 218 secured to the base or lower walls of rails 34, and outboard laterally extending flanges 220 secured to the inner rocker panel members 52 immediately adjacent the flanges 154 thereof. Bracing members 214 further brace the rocker panel members 52 and the rocker panel structures to the rails 34 in cooperation with the bracing member 156.

Referring now particularly to FIGURES 1, 3 and 4, of the drawings, a spring seat support 224 includes a generally U-shaped mounting portion 226 which overlaps and is secured to the lower wall and side walls of each of the rails 34 generally below the upper wall of the portion 70 of the seat pan 18. Immediately rearwardly of the spring seats 224, an angle cross member 228, FIGURE 3, extends between the rails 34, to reinforce the compartment pan 22 adjacent the joint between the compartment pan and the seat pan 18.

As shown in FIGURE 8, the compartment pan 22 is provided with laterally and outwardly extending flanges 230 immediately rearwardly of the flanges 69 thereof. U-shaped filler members 232 have their upper legs secured to flanges 230, as shown, and their lower legs secured to a flange portion 234 of panel 72, as shown in FIGURE 1. The rear offset end portions 235 of members 232 are secured to laterally extending flange portions 236 of pan 22, with portions 236 being braced to the rear ends of rails 34 by bracing members 238. The compartment pan 22 terminates in a laterally and rearwardly extending shelf or edge portion 240 which bears against and is secured to the rearward flanged ends of rails 34, as shown in FIGURE 8. In order to brace and interconnect the rearward ends of the rails 34, an angle brace member 242 is welded to the rear wall portion 244 and shelf portion 240 of the compartment pan inside of the compartment pan. This differs from conventional practice which ordinarily interconnects the rearward ends of similar rails by a brace located between the rails themselves rather than within the compartment pan or floor structure of the body.

Thus, this invention provides a new and improved vehicle body of the integral or self-sustaining type.

We claim:

1. In a vehicle body structure, the combination comprising, a body floor structure, an outer body panel member including an edge portion defining a portion of a body outer wheel opening, a body pillar member providing a body pillar face and being secured to said body panel member, said pillar member including an integral extension providing a continuation of said panel member and having an edge portion defining the remainder of said body wheel opening, and a body wheel house structure having an outer edge portion secured to said edge portions of said panel member and said extension, and having an inner edge portion secured to said floor structure.

2. In a vehicle body structure, the combination comprising, an outer body panel member including a lower edge portion defining a portion of a body outer wheel opening and a forward flanged edge portion defining a portion of an outer body door opening, and a body pillar member providing a body pillar face and including a flanged edge portion coterminous with said flanged edge portion of said body panel member and being secured thereto, said pillar member flanged edge portion merging into an integral extension providing a continuation of said panel member, said extension having an edge portion defining the remainder of said body wheel opening and a flanged portion providing a continuation of said flanged edge portion and defining the remainder of said outer body door opening.

3. In a vehicle body structure, the combination comprising, a body floor structure, a hollow body sill structure of box like construction and including an outer wall, an outer body panel member including a lower edge portion defining a portion of a body outer wheel opening and a forward edge portion defining a portion of a body side door opening, a body pillar member providing a body pillar face and including an edge portion, one portion of which is secured to said edge portion of said body panel member, the other portion of said pillar edge portion merging into an integral extension providing a continuation of said panel member and having an edge portion defining the remainder of said body wheel opening, said extension merging into said outer wall of said sill structure and being secured thereto, and a closure panel closing said sill structure and being secured thereto and to said extension.

4. In a vehicle body structure, the combination comprising, a body floor structure, a hollow box like body sill structure secured to said floor structure and terminating in an open end portion, said sill structure including upper, lower, outer and inner side walls, an outer body panel member including a lower edge portion defining a portion of a body outer wheel opening and a forward flanged edge portion defining a portion of a body side door opening, a body pillar member seating on said upper wall of said sill structure and providing a body pillar face, said pillar member including a flanged edge portion, one portion of which is secured to said flanged edge portion of said body panel member, the other portion of said flanged edge portion merging into an integral extension providing a continuation of said panel member and having an edge portion defining the remainder of said body wheel opening, said extension including a portion merging into said outer and lower walls of said sill structure to form continuations thereof and being secured thereto, and a closure plate member closing said sill structure and being secured to the inner wall thereof and to said extension portion providing said continuation of said outer and lower walls of said sill structure.

5. In a vehicle body structure, the combination comprising, a body floor structure, a hollow box like body sill structure secured to said floor structure, and terminating in an open end portion, said sill structure including upper, lower, outer and inner side walls, an outer body panel member including a lower edge portion defining a portion of a body outer wheel opening and a forward flanged edge portion defining the upper portion of a body side door opening, a body pillar member seating on said upper wall of said sill structure and providing a body pillar face, said pillar member including a flanged edge portion, one portion of which is secured to said flanged edge portion of said body panel member, the other portion of said flanged edge portion merging into an integral extension providing a continuation of said panel member and having an edge portion defining the remainder of said body wheel opening, said extension including a portion merging into said outer and lower walls of said sill structure to form continuations thereof and being secured thereto, a wheel housing having an outer edge portion secured to said panel member edge portion and said extension edge portion, said edge portion extending inwardly of said body structure along said upper wall, and a closure plate member closing said sill structure and being secured to the inner wall thereof to said inwardly extending edge portion of said wheel housing, and to said extension portion providing said continuation of said outer and lower walls of said sill structure.

6. In a vehicle body structure, the combination comprising, an outer body panel member including an upper edge portion, a lower edge portion defining a portion of a body outer wheel opening and a forward edge portion defining the upper portion of a body side door opening, a body pillar member providing a body pillar face and including an inner edge portion and an outer edge portion, one portion of said pillar member outer edge portion being secured to said forward edge portion of said body panel member, the other portion of said pillar member outer edge portion merging into an integral extension providing a continuation of said panel member and having an edge portion defining the remainder of said body wheel opening, a wheel housing structure secured to said panel member lower edge portion and to said extension edge portion, and an inner body panel member secured to said wheel housing, to said upper edge portion of said panel member and to said inner edge portion of said pillar member.

7. In a vehicle body structure, the combination comprising, a body floor structure including a pair of floor portions offset with respect to each other and joined by an intermediate wall portion extending angularly thereto, a pair of laterally spaced longitudinally extending sill structures secured to said floor structure, a laterally extending brace structure secured to one of said offset portions adjacent said wall portion and being secured to said sill structures, a pair of laterally spaced longitudinally extending rail structures located intermediate said sill structures, said rail structures being secured to said offset portions and to said brace structure and being spaced from said wall portion, and a brace member secured to said brace structure and to the portions of each of said rail structures spaced from said wall portion.

8. In a vehicle body structure, the combination comprising, a body floor structure including a pair of floor portions offset relative to each other and joined by an intermediate wall portion extending angularly thereto, a pair of laterally spaced longitudinally extending sill structures secured to said floor structure, a laterally extending brace structure secured to one of said offset portions adjacent said wall portion and being secured to said sill structures, a pair of laterally spaced longitudinally extending channel rail structures located intermediate said sill structures, said rail structures being spaced from said wall portion and having the channel legs thereof secured to said offset portions and to said brace structure, and a brace member secured to said brace structure and to the portions of each of said rail structures spaced from said wall portion to close said rail portions.

9. In a vehicle body structure, the combination comprising, a body floor structure including an offset floor portion providing a housing for an axle assembly, a pair of laterally spaced longitudinally extending sill structures secured to said floor structure, laterally spaced brace structures secured to said offset floor portion, a pair of laterally spaced longitudinally extending rail structures located intermediate said sill structures, and brace means interconnecting said brace structures with said rail structures and with said sill structures.

10. In a vehicle body structure, the combination comprising, a body floor structure including an offset floor portion providing a housing for an axle assembly a pair of laterally spaced longitudinally extending sill structures secured to said floor structure, laterally spaced brace structures secured to said offset floor portion, a pair of laterally spaced longitudinally extending rail structures located intermediate said sill structures and said brace structures, and longitudinally spaced laterally extending brace means interconnecting said brace structures, said rail structures, and said sill structures.

References Cited in the file of this patent

UNITED STATES PATENTS

| | | |
|---|---|---|
| 2,073,058 | Greene | Mar. 9, 1937 |
| 2,126,607 | Boehner | Aug. 9, 1938 |
| 2,209,285 | Schjolin | July 23, 1940 |
| 2,240,022 | Saives | Apr. 29, 1941 |
| 2,645,519 | Stanfield et al. | July 14, 1953 |
| 2,711,340 | Lindsay | June 21, 1955 |
| 2,733,096 | Waterhouse et al. | Jan. 31, 1956 |
| 2,954,998 | Kushler et al. | Oct. 4, 1960 |